United States Patent Office 3,730,933
Patented May 1, 1973

3,730,933
STABLE VINYL ACETATE N-METHYLOLACRYL-
AMIDE LATEX WITH FULLY-HYDROLYZED
POLYVINYL ALCOHOL
Peter Fallon Stehle, Media, and Jack Dickstein, Hunting-
don Valley, Pa., and Samuel Loshaek, Stamford, Conn.,
assignors to Borden, Inc., New York, N.Y.
No Drawing. Continuation-in-part of abandoned applica-
tion Ser. No. 881,580, Dec. 2, 1969. This application
June 18, 1971, Ser. No. 154,642
Int. Cl. B32b 21/18; C08f 37/18
U.S. Cl. 260—29.6 WB       13 Claims

ABSTRACT OF THE DISCLOSURE

Novel stable vinyl acetate/N-methylolacrylamide co-
polymer latexes containing fully-hydrolyzed polyvinyl al-
cohol, specially suitable in water-resistant adhesives, are
prepared by a method which comprises dispersing the
polyvinyl alcohol in water substantially in absence of the
monomeric reactants and effecting copolymerization while
adding both monomers gradually and simultaneously to
the polyvinyl alcohol dispersion, the vinyl acetate and the
N-methylolacrylamide being added in substantially con-
stant ratio and at a rate substantially not exceeding the
rate of their copolymerization.

REFERENCE TO RELATED APPLICATION

This application is a continuation-in-part of copending
application Ser. No. 881,580 which was filed on Dec. 2,
1969 and now abandoned.

An alternative method for obtaining stable latexes of
vinyl acetate/N-methylolacrylamide copolymers with
fully-hydrolyzed polyvinyl alcohol is the subject of appli-
cants' copending application Ser. No. 881,613 filed Dec.
2, 1969. The alternative method comprises first dispersing
all the vinyl acetate monomer to be copolymerized in
an aqueous composition containing both the polyvinyl
alcohol and certain surfactants, and then copolymerizing
while gradually adding the N-methylolacrylamide at a
specially controlled rate.

BACKGROUND OF THE INVENTION

It is known that copolymers of vinyl acetate (VAc)
with minor amounts of N-methylolacrylamide (NMA)
provide excellent adhesive binders being capable of cross-
linking with the assistance of heat or acid catalysis. It is
also known that when latexes of polyvinyl acetate are
colloidally supported by polyvinyl alcohol, said latexes
have properties which are desirable in adhesive applica-
tion, including good "grab" and minimal cold flow. By
suitable choice of polyvinyl alcohol with regard to molec-
ular weight and degree of hydrolysis certain latex proper-
ties such as viscosity can be tailor-made.

Attempts to combine the advantages of both N-meth-
ylolacrylamide and polyvinyl alcohol in the preparation
of the same polyvinyl acetate latex have been made but
have met with only partial success. Difficulty arises from
the fact that N-methylolacrylamide is highly soluble in
water and practically insoluble in vinyl acetate monomer
so that the N-methylolacrylamide tends to polymerize
with itself in the water, resulting in a nonhomogeneous
product of polymerization mixed non-uniformly with the
polyvinyl alcohol and tending to coagulate during polym-
erization or to gel shortly thereafter.

A method for emulsion-copolymerization of vinyl ace-
tate and NMA which has been disclosed in U.S. 3,301,809
is restricted to the use of polyvinyl alcohol hydrolyzed
to the extent of from about 80% to 90% and having a
standard viscosity in 4% aqueous solution at 20° C. lim-
ited to the range of from about 5 to 25 centipoises.

Such narrow limitations as to type have correspond-
ingly limited the usefulness of polyvinyl alcohols in tailor-
making VAc/NMA latex properties. Thus, in particular,
the restriction against using polyvinyl alcohol hydrolyzed
to an extent of more than about 90% has prohibited ex-
ploitation of the inherent high water-resistance possessed
by the so-called "fully-hydrolyzed" polyvinyl alcohols.

Furthermore, even when the polyvinyl alcohol is chosen
from those types which are permitted by the aforemen-
tioned disclosed procedures for preparing vinyl-acetate/N-
methylolacrylamide latexes, the resultant products have
a serious drawback. On storage they undergo a steady rise
in viscosity, reaching a gelled condition in less than six
months and frequently in only about three months.

SUMMARY OF THE INVENTION

A means has now been found whereby aqueous latexes
having improved stability can be made by copolymerizing
vinyl acetate in the presence of polyvinyl alcohols select-
able from a wide range of types including the more water-
resistant fully-hydrolyzed varieties and the full range of
viscosity grades, in particular those which have hereto-
fore not been usable, namely polyvinyl alcohols with a
standard viscosity of about 30 centipoises and greater.

Briefly stated, the present invention comprises a method
for copolymerizing the monomers vinyl acetate and
N-methylolacrylamide which method comprises dispers-
ing polyvinyl alcohol in water substantially in the absence
of said monomers, adding a free-radical donor to the
polyvinyl alcohol dispersion and causing the free-radical
donor continuously to initiate copolymerization while add-
ing gradually and simultaneously thereto both said mono-
mers, the vinyl acetate and the N-methylolacrylamide
being added in substantially constant ratio and at a rate
substantially not exceeding the rate of their copolymer-
ization.

Latexes made in the manner of this invention have
proved to provide adhesives with superior water-resist-
ance, surprisingly even when the water in which the poly-
vinyl alcohol is dissolved contains anionic surfactants
which might be expected to neutralize the water-resistant
property conferred by the fully-hydrolyzed polyvinyl al-
cohol.

This invention also includes the novel latexes of this
invention which have been found unexpectedly to be shelf-
stable for periods in excess of eighteen months without
separation or gelation, even at solids content as high as
60% by weight, exemplarily from about 40% to 60%
solids.

DETAILED DESCRIPTION

This invention relates to stable latexes of vinyl acetate/
N-methylolacrylamide copolymers made with polyvinyl
alcohol and in particular with fully-hydrolyzed polyvinyl
alcohol. According to this invention, an aqueous disper-
sion or emulsifying composition containing polyvinyl al-
cohol is placed into, or prepared in, a reactor vessel
equipped with agitation and means of heating and cool-
ing. Addition of vinyl acetate and N-methylolacrylamide
is delayed until a level of free-radicals is provided for
the continuous initiation of polymerization. Thus, a free-
radical donor commonly known as a polymerization ini-
tiator is added to the aqueous dispersion and caused to
provide a sufficient concentration of free-radicals either
by heating or by addition of a reducing agent, using the
well-known "redox" system. After said free-radical level
is established, or at least no sooner than when such level
is established, the gradual and simultaneous addition of
vinyl acetate and N-methylolacrylamide is commenced.

Thus, the copolymerization of this invention is carried
out while gradually and simultaneously adding both vinyl
acetate and N-methylolacrylamide monomers to an aqueous medium containing the polyvinyl alcohol. The gradual addition can be performed either portionwise in small increments or continuously with metered addition as by use of an apportioning pump.

A feature of the invention is that these simultaneous additions are made with respective rates such that the amount of vinyl acetate added in any given increment of time is in substantially constant ratio to the amount of N-methylolacrylamide added in the same increment of time.

Another feature of the invention is that the rate of addition of each of the reactant monomers to the aqueous composition is substantially equal to the rate with which this reactant is converted to copolymer. Thus the total rate of addition of reactant monomers (e.g. vinyl acetate and NMA) expressed as weight of total monomers per unit of time is substantially equal to the rate with which copolymer is formed, again expressed as weight per same unit of time.

The equality of the rate of monomer additions with the rate of copolymerization can be checked by comparing the weight of copolymer formed during a particular period of time, with the weight of monomers added during the same period. Thus, at two points of time $t_1$ and $t_2$, small aliquots are taken from the aqueous composition and the solids are determined by weighing the dried residue. From these data, the weight of copolymer $W_P$ formed in the period $t_2-t_1$ can be calculated. The weight of monomers $W_M$ added during the same period can be measured in any of a number of well-known ways such as from readings of a meter. For the purposes of this invention, the rates of monomer addition and copolymerization can be considered as substantially equal when the weights of copolymer, $W_P$, and monomer $W_M$, agre within (i.e. differ by) no greater than about 10%, preferably within no greater than about 5%.

When the rates of addition deviate substantially from the conditions of this invention, such as when the weight of total monomers added per unit of time differs by more than 10% from the total weight of copolymer formed in the same unit of time, unstable latexes result, either coagulating during polymerization or gelling shortly thereafter.

Stable latexes can be made by the method of the instant invention using a variety of polyvinyl alcohols. There are no restrictions as to viscosity types or as to extent of hydrolysis. Thus, stable latexes of vinyl acetate copolymers containing up to about 7% N-methylolacrylamide can be made with viscosity grades ranging from 5 centipoises to about 135 centipoises as well as with polyvinyl alcohols whose extent of hydrolysis varies from 80% to 100%.

The instant method is particularly advantageous in making possible the use of polyvinyl alcohol grades which are not applicable in methods of the prior art. Thus there can be used polyvinyl alcohols having standard viscosity (in 4% aqueous solution at 20° C.) equal to 30 centipoises and higher, viscosity grades from about 30 to 65 centipoises being particularly suitable. Likewise, the highly hydrolyzed grades of polyvinyl alcohol, previously unusable, in the range from 91% to complete hydrolysis, can be used in the method of the instant invention.

Since a main objective of the invention is to make copolymer latexes which have superior water-resistant properties in glues, chief interest of applicants has centered upon developing the method of this invention in preparing stable latexes with polyvinyl alcohols of the fully-hydrolyzed classification including those polyvinyl alcohols which are at least about 93% or 95% hydrolyzed. For best performance in glues it is preferred to use polyvinyl alcohols which are at least 97% hydrolyzed and in particular, those which are greater than 99% hydrolyzed.

As to amounts, it is convenient to use from about 2 to 8 parts by weight of polyvinyl alcohol per 100 parts of vinyl acetate monomer. For best results it is preferred to use from about 3 to 6 parts by weight polyvinyl alcohol for 100 parts of vinyl acetate.

The method of this invention can be carried out with polyvinyl alcohol as the sole emulsifier. However, it is also permissible to use therewith an anionic surfactant in amounts between about 0.01 and about 2 parts, and preferably from about 0.1 to 0.5 part, by weight per 100 parts vinyl acetate monomer. The presence of an anionic surfactant is advantageous in that it facilitates smooth polymerization and uniformity of copolymer.

Surprisingly, surfactants may be present without impairing the water-resistance conferred by fully-hydrolyzed polyvinyl alcohol. The amount used for optimum overall effect will depend partly on the level of N-methylolacrylamide to be copolymerized. Other factors will occur to those skilled in the art and the optimum amounts for any specific end use would be selected by experimentation as is known to practitioners of emulsion polymerization.

In general, applicants have found sodium lauryl sulfate as a particularly useful surfactant in the method of this invention, in amounts between about 0.01% to 2% by weight, based on vinyl acetate monomer and in particular between about 0.1% and about 0.5% thereof.

While applicants do not wish to be limited by theoretical considerations, it appears that an advantage of the anionic surfactants is their facile tendency to generate new and small particles. Illustrative of other anionic surfactants which can be used in this invention, there can be mentioned sodium N-alkyl sulfosuccinamates, such as are available commercially under the names Aerosol 18 and Aerosol 22; dialkyl esters of sodium sulfosuccinic acid, such as are available commercially as Aerosol OT and Aerosol MA; the sodium or ammonium salts of the sulfate ester of an alkyl phenoxy poly (ethylene oxy) ethanol, such as are available commercially as Alipal CO-433 and Alipal CO-436; the sodium salt of an alkyl aryl polyether sulfonate, such as is available commercially as Triton X-200; and alkyl aryl sodium sulfonates such as for example Siponate DS-10.

The free-radical donor used to initiate polymerization in the method of this invention can be selected from any of the initiators for aqueous emulsion polymerization known in the art. The continuous initiation of polymerization, i.e. the establishment of a continuing sufficient level of free-radicals for initiating the formation or copolymer molecules, is achieved either by using a temperature sufficiently high to cause the free-radical donor molecules to undergo thermal scission, or by the continuous or gradually portionwise addition of a reducing agent using the well-known "redox" procedure. The temperature chosen for the copolymerization will depend largely on the type of initiation used. Thus thermal scission is carried out exemplarily in the range of about 60° to 88° C., suitably in the range of about 75° to 85° C.; while the "redox" procedure is conveniently carried out at temperatures in the range of about 30°–60° C. Thermal activation of copolymerization is preferred.

Water-soluble type initiators are usually to be preferred, including potassium persulfate, sodium persulfate, ammonium persulfate, hydrogen peroxide, and others which will be known to those skilled in the art. When these are to be used together with reducing agents it is preferred to use reducing materials which are water soluble such as sodium formaldehyde sulfoxylate, sodium metabisulfite, and ascorbic acid. The amounts of initiator and reducing agent to be used will depend upon the rate of polymerization desired and upon other factors which are well-known in the art. Preferably, between about 0.1% and 2%, especially from 0.2% to 1% by weight of the initiator is used. If a reducing agent is used, this also is used in amount totaling between about 0.1% and 2%, especially from 0.2% to 1% by weight of the total copolymer.

The amounts of N-methylolacrylamide which can be copolymerized according to the method of this invention can vary from substantially not less than 0.5% up to about 7% of the weight of vinyl acetate monomer. The amount selected for a particular product depends, among several factors, upon the degree of cross-linking desired and upon the degree to which the N-methylolacrylamide is depended upon as a contributor to the colloid stability of the latex particles. In view of the ability of N-methylolacrylamide to contribute to stability when properly copolymerized, smaller amounts of polyvinyl alcohol can be used when larger amounts of N-methylolacrylamide are incorporated. Of course, the end properties of the product as a glue also depend upon the absolute and relative amounts of polyvinyl alcohol and N-methylolacrylamide and the accomplished practitioner will select a combination of these factors giving the particular balance of properties needed for a specific intended end-use. In the experience of the applicants, best over-all results have been obtained by maintaining the polyvinyl alcohol within the range of about 3 to 6 parts and the N-methylolacrylamide in the range of about 1 to 4 parts, based on 100 parts by weight of vinyl acetate monomer.

A variation in carrying out the method of this invention is to include in the initial aqueous polyvinyl alcohol dispersion a compatible seed latex. Such seed latex can be selected from synthetic emulsion polymers such as a vinyl acetate homopolymer or a vinyl acetate copolymer with minor amounts of comonomers such as N-methylolacrylamide, methyl acrylate, ethyl acrylate or their combinations. The seed latex can be a preformed latex, previously prepared and used in aliquot. Or alternatively, the seed latex can be prepared in situ in the initial aqueous composition either before or after adding the polyvinyl alcohol. In any case, the polyvinyl alcohol dispersion of the instant method preferably contains no more than a negligible quantity of unpolymerized vinyl acetate monomer at the time the gradual and simultaneous additions of vinyl acetate and N-methylolacrylamide are commenced.

The previously prepared or preformed latex can conveniently contain from about 40 to 60% solids and can be taken in amount to provide an amount of solids corresponding to from about 1% to 30% of the weight of the vinyl acetate monomer to be copolymerized by the method of this invention. A ratio of seed latex solids to vinyl acetate monomer of from about 5% to 15% is particularly suitable.

When the seed latex is prepared in situ, it is convenient to calculate the amount in terms of the minor portion of vinyl acetate which is present in the seed. Thus, of 100 parts by weight vinyl acetate in the entire end composition, from about 1 to 30 parts (preferably from about 5 parts to 15 parts) can be used to make the seed, exemplarily a homopolymer, in the initial aqueous composition containing the polyvinyl alcohol. After the seed polymerization is substantially complete, the remaining major part of the 100 parts of vinyl acetate is copolymerized with N-methylolacrylamide by the method of the instant invention.

The latexes prepared by the method of this invention have excellent adhesive properties, including good "grab." They give cross-linked films when applied to a wide variety of solid substrates, in particular porous substrates such as wood, paper and woven, nonwoven and knitted textiles, as well as also vinyl plastic films and metal substrates such as aluminum.

Strong laminates can be made by bonding together at least two solid substrates with a cross-linked film comprising the dried solids of a latex of the instant invention. The adhesive bonds show a high level of resistance to water; thus, for example, when wood is laminated to wood with a latex of this invention, standard tests made after exposure to boiling water show about 50% wood failure as compared to only about 20% wood failure commonly obtained in such tests with corresponding latexes of the prior art. Laminates can be made with the latexes of the instant invention which exhibit negligible cold flow. These latexes are thus particularly suitable for the manufacture of plywood and the like, as well as particle board.

This invention will be further illustrated by description in connection with the following specific examples of the practice of it, wherein proportions are in parts by weight unless otherwise stated, as also elsewhere herein.

EXAMPLE 1

This example illustrates a modification of the method of this invention wherein a seed latex is preformed in situ in the aqueous polyvinyl alcohol before commencing the gradual addition of the vinyl acetate and N-methylolacrylamide monomers.

A ten gallon stainless steel reactor provided with agitator and reflux condenser was charged with 70.0 parts by weight of deionized water, 5.0 parts of a grade of polyvinyl alcohol characterized as 99%–100% hydrolyzed and 30 cps. viscosity, 0.1 part of sodium bicarbonate. When a clear homogeneous solution was obtained, 10.0 parts vinyl acetate monomer was added. The reactor and its contents were purged of air by means of nitrogen gas. The contents were then heated to about 65° C. and a solution of 0.05 part of ammonium persulfate in 1.25 parts water was added. Polymerization was allowed to take place at about 65° C. until substantially completed as indicated by a rise of temperature to 85° C. and cessation of vinyl acetate reflux. To this "seed latex" containing substantially no vinyl acetate monomer there was then added gradually at a constant rate over a period of four hours two separate feeds, one consisting of 87.5 parts of vinyl acetate monomer, the other consisting of 2.5 parts of N-methylolacrylamide and 21.1 parts water. During the four hours there was also added gradually a solution of .20 part ammonium persulfate in 2.75 parts water. Temperature during the four hour period was maintained at 82°–85° C. and the reflux observed was negligible. At the conclusion of addition the temperature was raised to 90° C. for an additional half-hour to complete polymerization.

The product latex was cooled and discharged into drums through a nylon knit cloth. Coagulum deposited on the cloth was negligible. The product latex had a solids content equal to 52.1%, Brookfield viscosity (LVF spindle 4, 60 r.p.m.) was 3600 cps., the pH was 4.3.

Intrinsic viscosity.—Thin films cast from this latex were vacuum-dried at room temperature, sufficient dried film was added to acetone to prepare a solution of concentration between 0.5 and 1.0%. This solution was passed through a fine filter to remove any insoluble matter and a precise determination of solids content was made. The filtrate and dilutions thereof were then used to determine the intrinsic viscosity as described, for example, in Flory, "Principles of Polymer Chemistry," 1953, page 309. Viscosities of the acetone solutions were determined at 30° C. using a Cannon-Fenske modification of the Ubbelohde Viscosimeter. Results obtained by this procedure have been found to be in agreement with results obtained when the polymer was coagulated and washed free of polyvinyl alcohol and other water-soluble materials.

The intrinsic viscosity determined in this manner for the polymer recovered from the latex of this example was equal to 0.53 dl./g.

This latex remained fluid and without separation or gelation for at least eighteen months after preparation, providing substantially the same adhesive strength after such storage period as initially.

Adhesion tests.—Evaluation of adhesive strength was carried out according to the procedure outlined in Section 4 of the Department of Commerce National Bureau of Standards Product Standard No. PS–1–66. In one series of tests, 90 parts of the latex of this example was formulated into an adhesive with 10 parts of a commercially available phenol formaldehyde resole resin containing 74% solids and catalyzed with 5 parts of 50% aqueous paratoluene sulfonic acid. This adhesive mixture was applied to fir veneer at 45 lbs. per 1000 sq. ft. single glue line to form a three-ply board. The assembly was pressed at 150 p.s.i. for one hour at room temperature, conditioned at 50% RH and 70° F. for 21 days (and tested according to the above-cited procedure. Wood failure observed was 98% dry, 99% after the boil cycle and 98% after the vacuum-pressure cycle.

In another series of tests 100 parts of the latex of this example was formulated with 5 parts of 50% aqueous paratoluene sulfonic acid and applied on fir veneer as above. The corresponding results as to wood failure were 99% dry, 90% after the boil cycle and 98% after the vacuum-pressure cycle.

The high level of water-resistant adhesion inherent with this latex is also illustrated by the results obtained when no catalyst or other adjuvant is added. Corresponding tests made as above described, showed wood failures equal to 53% after the boil cycle and 49% after the vacuum-pressure cycle. Experience has shown that latexes prepared according to method of the prior art, with the partially hydrolyzed types of polyvinyl alcohol to which such methods are restricted, consistently give in corresponding tests no more than 20% wood failure after the boil cycle or vacuum-pressure cycles.

EXAMPLE 2

The procedure of Example 1 was followed except that the initial charge into the reactor included 0.20 parts of the surfactant commercially available as Aerosol 22 and identified as tetrasodium N-1,2-dicarboxyethyl)-N-octadecylsulfosuccinamate. The product latex had 48.8% solids, viscosity equal to 2800 cps., pH equal to 4.4, coagulum during preparation was negligble and shelf stabilty was excellent. Intrinsic viscosity of copolymer, determined as described in Example 1 was 0.6 dl./g.

EXAMPLE 3

The procedure of Example 2 was followed except that 5 parts of the vinyl acetate gradually fed to the seed was replaced by 5 parts of methyl acrylate. The product latex had 49.2% solids and a viscosity equal to 1900 cps., and a pH equal to 4.4, coagulum formed during polymerization was negligible, shelf stabilty of the finished product was excellent. Intrinsic viscosity of the recovered polymer was 0.41 dl./g.

EXAMPLE 4

This example illustrated the method of this invention wherein the initial aqueous composition contained polyvinyl alcohol without seed.

A ten gallon stainless steel reactor provided with agotator and reflux condenser was charged with 70.0 parts by weight of deionized water, 5.0 parts of a grade of polyvinyl alcohol characterized as 99%–100% hydrolyzed and 30 cps. viscosity, 0.1 part of sodium bicarbonate and 0.20 part Aerosol 22. The reactor and contents were purged of air using nitrogen gas. Contents were then heated to 65° C. at which point simultaneous feeds were started of 97.5 parts of vinyl acetate monomer, a solution of 2.5 parts N-methylolacrylamide in 21.1 parts water and a solution of 0.05 part of ammonium persulfate in 1.25 parts water, at substantially constant and proportionate rates so that four hours was required to complete the additions. Temperature was raised to 82°–85° C. during the first half hour and maintained at 82°–85° C. during the remainder of the addition. Reflux was practically absent. At the conclusion of addition, the temperature was raised to 90° C. for an additional half hour to complete polymerization. The resultant latex had no coagulum, the solids content was 50.4%, pH was 4.5 and Brookfield viscosity was 6000 cps. (at 4/60). This latex has shown excellent shelf stability, giving no evidence of change after at least six months.

EXAMPLE 5

The procedure of Example 1 was used except that 0.125 part of sodium lauryl sulfate sold commercially as Sipon WD was included in the initial charge. The resulting latex had 49.9% solids, Brookfield viscosity of 2300 cps. with LVF spindle #4 at 60 r.p.m., pH equal to 3.9. Coagulum formed during the polymerization was negligble and the latex was still stable after storage for a period in excess of one year.

EXAMPLE 6

The procedure of Example 2 was followed except that the quantity of N-methylolacrylamide in the gradual feed was raised to 3.5 parts and the vinyl acetate in the gradual feed was reduced to 86.5 parts. The resulting latex had a pH of 4.5 and Brookfield viscosity (LVF #4/60 r.p.m.) of 3700 cps. at 49.5% solids. Excellent shelf stabilty was observed over a period up to about a year, still being stable at the time of this writing.

In similar fashion, another latex was prepared according to the procedure of Example 2 except that the quantities of N-methylolacrylamide and vinyl acetate in the gradual feed were 5 parts and 85 parts, respectively. The pH of the latex was 4.5 and the Brookfield viscosity 4600 cps. at 49.6% solids. Again, the latex showed the same high level of shelf stability.

EXAMPLE 7

This example illustrates that the desired stability and adhesion can be obtained with variations in the proportionation of vinyl acetate used respectively (a) in an initial charge to form a seed and (b) in a gradual feed using the method of this invention.

A group of copolymers was prepared using the procedure of Example 1 except that the quantity of vinyl acetate added initially to form a polyvinyl acetate homopolymer seed and the vinyl acetate monomer added gradually were varied as summarized below. In all cases, (a) 5.0 parts of 99% hydrolyzed polyvinyl alcohol with a standard viscosity of 30 cps. was used to form the initial aqueous dispersion, (b) the vinyl acetate monomer remaining in the aqueous phase after formation of the seed and before commencing the gradual addition of vinyl acetate was negligible and (c) 2.5 parts of N-methylolacrylamide was added gradually, simultaneously with the amount of vinyl acetate given in Column II.

|   | Parts of vinyl acetate | | | | |
|---|---|---|---|---|---|
|   | I | II | | | |
|   | Used to form seed | Added gradually | Percent solids | pH | Cps.; Brookfield viscosity 4/60 |
| A | 5 | 92.5 | 51.2 | 4.0 | 2,800 |
| B | 20 | 77.5 | 48.5 | 4.1 | 2,200 |
| C | 30 | 67.5 | 50.3 | 4.0 | 6,700 |

All latexes had negligible coagulum and excellent shelf stability.

These latexes were incorporated into adhesive mixtures containing, by weight, 90 parts latex and 10 parts of a commercially available phenol-formaldehyde resole resin containing 74% solids. The adhesive was catalyzed with 5 parts of 50% aqueous paratoluene sulfonic acid. These specimens were prepared and tested according to the procedure described in Example 1. A high level of water-resistant adhesion was obtained as indicated below:

| Latex | Percent wood failure | |
|---|---|---|
|   | Boil | Vacuum-pressure |
| A | 87 | 87 |
| B | 88 | 90 |
| C | 90 | 90 |

EXAMPLE 8

This example illustrates the applicability of the method of this invention with polyvinyl alcohol of varying degree of hydrolysis and standard viscosity (as measured at 20° C. in 4% aqueous solution).

A group of copolymers was prepared by the procedure of Example 1 except that the polyvinyl alcohol used was varied as indicated below. In all cases, 2.5 parts of N-methylolacrylamide and 5.0 parts of polyvinyl alcohol was used.

|   | Degree of hydrolysis of PVA | Standard viscosity of PVA | Percent solids of latex | pH | Cps., Brookfield viscosity (4/60) |
| --- | --- | --- | --- | --- | --- |
| A | 99–100 | 87 | 51.3 | 4.5 | 6,700 |
| B | 99–100 | 59 | 51.1 | 4.1 | 3,700 |
| C | 93–94 | 37 | 51.6 | 4.4 | 2,100 |

All latexes had excellent shelf stability showing no instability in excess of a year.

In contrast to this, corresponding latexes of the same composition, but made without the benefit of the method of the instant invention, adding the NMA and initiator at the same rate, but having all the vinyl acetate initially in one portion, become increasingly viscous over a period of about three months at which time they undergo complete gelation and are unusable as an adhesive.

EXAMPLE 9

The procedure and composition of Example 4 are followed except that the Aerosol 22 is omitted, the N-methylolacrylamide is increased to 3.5 parts and the vinyl acetate is decreased to 96.5 parts. The latex obtained shows excellent shelf stability.

EXAMPLE 10

A series of latexes is prepared using the procedure of Example 1, except that the grades of polyvinyl alcohol used successively are characterized respectively as

| Degree of hydrolysis (percent): | Viscosity of 4% aqueous dispersion at 20° C. |
| --- | --- |
| 99.3–100 | 115–135 |
| 97.6–98.4 | 45–55 |
| 99–100 | 28–32 |
| 94–96 | 40–60 |

In all cases, the latex obtained has excellent shelf stability, showing no coagulation or separation over a period of at least six months.

It will be understood that it is intended to cover all changes and modifications of the examples of the invention herein chosen for the purpose of illustration which do not constitute departures from the spirit and scope of the invention.

What is claimed is:

1. A process of preparing a stable latex of a copolymer of 100 parts by weight of the monomer vinyl acetate and 0.5 to 7 parts of the monomer N-methylolacrylamide in the presence of about 2 to 8 parts of a polyvinyl alcohol hydrolyzed to the extent of at least 93% and having a standard viscosity (in 4% aqueous solution at 20° C.) of at least about 30 centipoises which method comprises
   (a) dispersing in water, in the substantial absence of said monomers, from about 2 to 8 parts by weight of said polyvinyl alcohol,
   (b) adding to the polyvinyl alcohol dispersion a free-radical donor and causing same to initiate copolymerization while
   (c) gradually and simultaneously adding to said dispersion 100 parts of vinyl acetate monomer and from about 0.5 to 7 parts of N-methylolacrylamide, the vinyl acetate and N-methylolacrylamide being added in substantially constant ratio and at a rate substantially not exceeding the rate of copolymerization.

2. The process of claim 1 wherein the polyvinyl alcohol is hydrolyzed to the extent of at least about 97%.

3. The process of claim 1 wherein the aqueous polyvinyl alcohol dispersion includes between about 0.05 and 2 parts of an anionic surfactant.

4. The process of claim 1 wherein the aqueous polyvinyl alcohol dispersion includes a seed latex selected from emulsion polymers consisting of vinyl acetate homopolymers and vinyl acetate copolymers with minor amounts of comonomers selected from the group consisting of N-methylolacrylamide, methyl acrylate, ethyl acrylate and their combinations.

5. The process of claim 1 wherein a vinyl acetate homopolymer seed latex is first prepared in situ in the aqueous polyvinyl alcohol dispersion, using from about 1 to 30 parts of the 100 parts of vinyl acetate and wherein the remaining vinyl acetate is then copolymerized with N-methylolacrylamide as in step (c).

6. A stable latex, made by the process of claim 1, containing from about 40 to 60% solids consisting essentially of a vinyl acetate/N-methylolacrylamide copolymer and a polyvinyl alcohol hydrolyzed to the extent of at least about 93% and having a standard viscosity of at least about 30 centipoises as determined at 20° C. with a 4% aqueous solution; the composition of said solids by weight being from about 0.5 to 7 parts N-methylolacrylamide and from about 2 to 8 parts polyvinyl alcohol per 100 parts vinyl acetate.

7. A stable latex made by the process of claim 5, containing from about 40% to 60% solids consisting essentially of (a) a vinyl acetate homopolymer, (b) a vinyl acetate/N-methylolacrylamide copolymer and (c) a polyvinyl alcohol hydrolyzed to the extent of at least about 93% and having a standard viscosity of at least about 30 centipoises; the overall composition by weight of said solids being from about 0.5 to 7 parts N-methylolacrylamide and from about 2 to 8 parts polyvinyl alcohol per 100 parts vinyl acetate and the weight ratio of the homopolymerized vinyl acetate to the copolymerized vinyl acetate being from about 1 to 30%.

8. A solid substrate coated with a crosslinked film comprising the dried solids of the aqueous latex of claim 6.

9. A solid substrate coated with a crosslinked film comprising the dried solids of the aqueous latex of claim 7.

10. A laminate comprising at least two solid substrates which are adhesively bound together by a crosslinked film comprising the dried solids of the aqueous latex of claim 8.

11. A laminate comprising at least two solid substrates which are adhesively bound together by a crosslinked film comprising the dried solids of the aqueous latex of claim 7.

12. A process of preparing a stable latex of a copolymer of the monomers vinyl acetate and N-methylolacrylamide which comprises
   (a) dispersing in water, in the substantial absence of said monomers, from about 2 to 8 parts by weight of polyvinyl alcohol which is hydrolyzed to the extent of at least about 93% and has a standard viscosity (in 4% aqueous solution at 20° C.) of at least about 30 centipoises,
   (b) adding to the polyvinyl alcohol dispersion a free-radical donor and causing same to initiate copolymerization by heating to from about 75° to 88° C. while
   (c) gradually and simultaneously adding to said dispersion 100 parts of vinyl acetate monomer and from about 0.5 to 7 parts of N-methylolacrylamide, wherein the vinyl acetate and N-methylolacrylamide are added in substantially constant ratio wherein the weight of total monomers added per unit of time is substantially equal to the weight of copolymer formed per same unit of time.

13. A process of preparing a stable adhesive latex which comprises
 (a) forming an aqueous composition containing (i) from about 3 to 6 parts by weight of polyvinyl alcohol hydrolyzed to the extent of at leaast about 97% and having a standard viscosity (in 4% aqueous solution at 20° C.) of at least 30 centipoises, (ii) an amount $n$ of vinyl acetate monomer equal to from about 5 to 15 parts and (iii) a free-radical donor.
 (b) causing the free-radical donor to homopolymerize the vinyl acetate until the aqueous composition is substantially free of vinyl acetate monomer, and
 (c) causing the free-radical donor to copolymerize vinyl acetate and N-methylolacrylamide while gradually and simultaneously adding to the aqueous composition $(100-n)$ parts of vinyl acetate monomer and from about 1 to 4 parts of N-methylolacrylamide; the vinyl acetate and N-methylolacrylamide being added in substantially constant ratio and at a rate substantially not exceeding the rate of copolymerization.

References Cited

UNITED STATES PATENTS

| 2,773,050 | 12/1956 | Caldwell et al. | 260—45.5 |
| 3,081,197 | 3/1963 | Adelman | 117—140 |
| 3,177,172 | 4/1965 | Adams | 260—29.6 |
| 3,297,613 | 1/1967 | Gibbs | 260—29.6 |
| 3,297,665 | 1/1967 | Abramo | 260—80.3 |
| 3,301,809 | 1/1967 | Goldberg et al. | 260—29.6 |
| 3,563,851 | 2/1971 | Armour et al. | 161—251 |
| 3,644,257 | 2/1972 | Nickerson et al. | 260—29.6 |

OTHER REFERENCES

Davidson et al., "Water Soluble Resins," Reinhold, New York, 1968 (pp. 109–117 and 121–23).

MELVIN GOLDSTEIN, Primary Examiner

U.S. Cl. X.R.

117—132 A, 138.8 UA, 148, 155 UA; 161—251